United States Patent [19]

Greenhalgh

[11] Patent Number: 4,595,528

[45] Date of Patent: Jun. 17, 1986

[54] PROCESS FOR IMMOBILIZING RADIOACTIVE BORIC ACID LIQUID WASTES

[75] Inventor: Wilbur O. Greenhalgh, Richland, Wash.

[73] Assignee: The United States of America as represented by the United States Department of Energy, Washington, D.C.

[21] Appl. No.: 608,739

[22] Filed: May 10, 1984

[51] Int. Cl.[4] .......................... G21F 9/16; C04B 35/00

[52] U.S. Cl. .................................... 252/629; 252/628; 252/631; 501/49; 501/155

[58] Field of Search ........................ 252/628, 629, 631; 159/DIG. 12; 501/49, 155; 65/DIG. 11

[56] References Cited

U.S. PATENT DOCUMENTS

| | | | |
|---|---|---|---|
| 3,890,244 | 6/1975 | Carlin | 252/631 |
| 4,086,325 | 4/1978 | Cordier et al. | 252/628 |
| 4,097,401 | 6/1978 | Guber et al. | 252/629 |
| 4,122,028 | 10/1978 | Iffland et al. | 252/631 |
| 4,253,985 | 3/1981 | Filter et al. | 252/628 |
| 4,299,611 | 11/1981 | Penberthy | 65/27 |
| 4,376,070 | 3/1983 | Pope et al. | 252/629 |
| 4,379,081 | 4/1983 | Rootham et al. | 252/628 |
| 4,409,137 | 10/1983 | Mergan et al. | 252/628 |
| 4,430,257 | 2/1984 | Pope et al. | 252/629 |

FOREIGN PATENT DOCUMENTS

| | | | |
|---|---|---|---|
| 0046085 | 2/1982 | European Pat. Off. | 252/629 |
| 2485243 | 12/1981 | France | 252/629 |
| 0226897 | 12/1984 | Japan | 252/629 |
| 2088116 | 6/1982 | United Kingdom | 252/629 |

*Primary Examiner*—Stephen J. Lechert, Jr.
*Assistant Examiner*—Howard J. Locker
*Attorney, Agent, or Firm*—Edward W. Nypaver; Robert Southworth, III; Judson R. Hightower

[57] ABSTRACT

A method of immobilizing boric acid liquid wastes containing radionuclides by neutralizing the solution and evaporating the resulting precipitate to near dryness. The dry residue is then fused into a reduced volume, insoluble, inert, solid form containing substantially all the radionuclides.

4 Claims, 1 Drawing Figure

PROCESS FOR IMMOBILIZING RADIOACTIVE BORIC ACID LIQUID WASTES

The United States Government has rights in this invention pursuant to Contract No. DE-AC14-76FF02170 between the U.S. Department of Energy and Westinghouse Electric Corporation.

BACKGROUND OF THE INVENTION

This invention relates generally to the treatment of radioactive waste solutions and, more particularly, to a process for immobilizing radioactive boric acid liquid wastes.

The safe and effective management of low-level radioactive waste is one of the most critical problems facing the nuclear industry today. Generally, low-level radioactive wastes are those wastes suitable for disposal in a near-surface facility and include routine wastes from reactor plants, radioactive wastes from hospitals and research institutions, and most industry-generated radioactive wastes. In order to meet present nuclear waste burial requirements under the Code of Federal Regulations as specified in 10 CFR 61, any radioactive waste solutions must be immobilized prior to such near-surface burial. The liquid wastes, or wastes continuing liquid, must be converted into a form that contains as little free standing and noncorrosive liquid as is reasonably achievable, but in no case shall the liquid exceed 1% of the volume of the waste.

One of the more common radioactive wastes that must be immobilized is spent boric acid aqueous solutions resulting from the boric acid utilized in the reactor control process of pressurized water reactor (PWR) facilities. A typical operating PWR can generate about 50,000 gallons of boric acid evaporator bottoms per year. A conventional method of treating such wastes, i.e., boric acid liquid wastes, is to neutralize them with sodium hydroxide and then concentrate the same in an evaporator to typically 10 to 12% solids. The resulting sodium borate slurries are then immobilized, usually in cement or urea-formaldehyde.

While these known processes have served their intended purposes, they have not been entirely satisfactory. For example, the immobilization of boric acid and borates in portland cement poses problems since borates retard setting of the cement and tend to destroy the hydraulic hardening characteristics of the cement. At present, there are limitations on the weight percent boric acid that can be solidified in portland cement and still meet transportation and waste burial requirements. Specifically, up to 16 weight percent boric acid is the maximum that can be solidified in portland cement under ordinary conditions without additives and the like. Also, this cement immobilization process generates as much as three times the original volume in solidified material, posing greater safety hazards and materially increasing haulage and burial costs.

The immobilization of boric acid and borates in urea-formaldehyde can cause container corrosion problems as a result of the acid catalyst employed therein. Moreover, a significant amount of "free water" can accumulate during setting and must be removed or solidified prior to burial. In light of the above, it can be appreciated that a need exists for converting boric acid liquid wastes into a more stable structural form possessing only negligible, if any, free standing liquid and for reducing the volume of such wastes while providing adequate radionuclide containment.

Accordingly, it is a primary object of the present invention to obviate the above noted shortcomings by providing a new and useful method of immobilizing radioactive boric acid liquid wastes in a manner achieving a substantial volume reduction of such wastes.

It is another object of this invention to convert the foregoing radioactive waste solutions into a stable, solid form providing improved radionuclide containment.

It is a further object of the present invention to convert boric acid radioactive waste solutions into an inert, insoluble glass product having optimum mechanical strength properties, and which is unaffected by moisture and other inadvertent intruders.

The foregoing and other objects, advantages, and characterizing features of the present invention will become clearly apparent from the ensuing detailed description of an illustrative embodiment thereof along with the accompanying drawing.

SUMMARY OF THE INVENTION

A method for immobilizing radioactive boric acid liquid wastes by neutralizing the solution with alkali metal or alkali earth compounds and evaporating the resulting precipitate to near dryness. The dry residue is then fired to form a reduced volume glass product containing the radionuclides.

BRIEF DESCRIPTION OF THE DRAWING

The single FIGURE is a representative flow process for practicing this invention.

DETAILED DESCRIPTION OF THE PREFERRED EMBODIMENT

Figure 1:
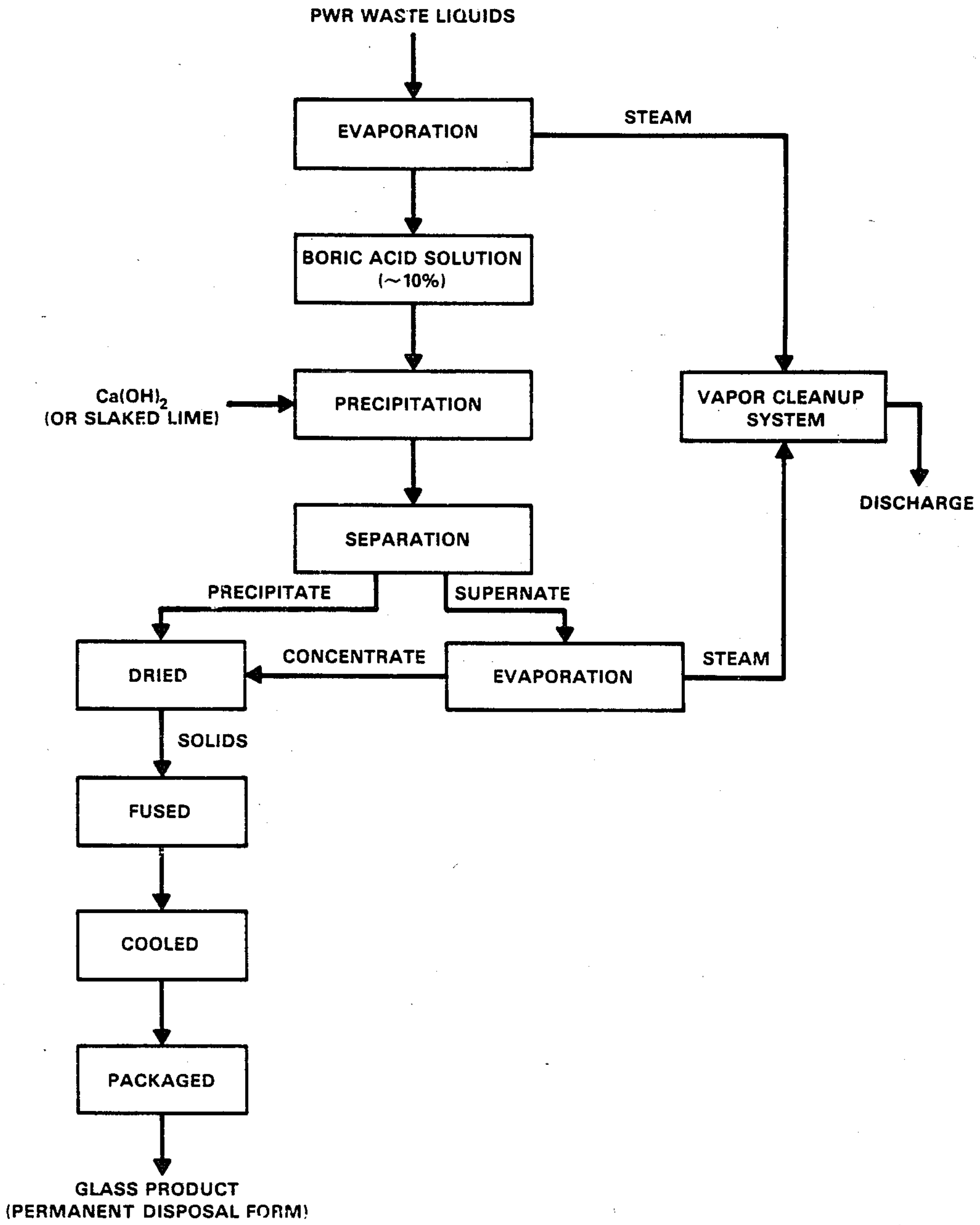

The bulk of low-level boric acid radioactive waste solutions are commonly generated in pressurized water reactor facilities which employ boric acid aqueous solutions in the reactor control process. In accordance with Federal Regulations, such radioactive wastes, commonly referred to as "radwastes", must be stored and disposed of in an environmentally acceptable manner and are solidified in sealed metal drums or containers for burial in suitable underground repositories.

The conventional practice for solidifying boric acid radioactive waste solutions is to immoblize them in cement for transport and storage. Basically, the spent boric acid liquid wastes averaging about 2 to 3 weight percent are normally neutralized with sodium hydroxide to yield sodium tetraborate and water according to the following equation:

$$4H_3BO_3+2NaOH \rightarrow Na_2B_4O_7+7H_2O$$

The sodium tetraborate product is then concentrated in an evaporator to typically 10 to 12% solids. The resulting sodium tetraborate slurries are then mixed with portland cement in the proper proportions. If required, water is added to the mixture to physically mix the components to a smooth paste or slurry. The resulting mixture is then poured into drums which are sealed closed.

However, as earlier mentioned, the immobilization of boric acid in portland cement poses certain problems since borates tend to retard setting of the cement and destroy the hydraulic characteristics of the cement. Moreover, an excessive moisture content in the mixture can result in free liquid forming out of the mixture upon solidification after the drum is sealed. The denser cement will settle to the bottom of the drum, forcing any appreciable amount of free liquid to the top surface of the cement. Also, transportation and storage costs are substantially increased since it has been found that one drum of concentrated boric acid bottoms, upon being immobilized in cement, yields up to three similarly sized drums of solids.

The present invention overcomes the disadvantages of the cement solidifying technique noted above and avoids the "free water" and corrosion problems associated with prior known waste solidifying methods by providing a glass vitrification process for converting boric acid liquid wastes into an inert solid form. The advantage residing in a glass vitrification process is that theoretical or near theoretical maximum waste packing efficiencies can be achieved. Indeed, the boric acid ($H_3BO_3$) itself can be dried and fused directly as $B_2O_3$ to form a glass product. However, this glass product is of low quality because of its solubility and poor physical characteristics as compared with other glasses. A better glass product is produced by neutralizing the boric acid with an alkali metal compound, such as sodium hydroxide, to form sodium tetraborate for example, which is then fused to yield borax glass. While the borax glass exhibits improved physical characteristics over the first mentioned glass product, it is still somewhat adversely affected by moisture and dissolves slowly in water. This waste glass product just barely meets the Code of Federal Regulation requirements as specified in 10 CFR 61.

In order to obtain an optimum final glass product in accordance with the preferred process of this invention, the boric acid is neutralized with an alkaline earth compound rather than an alkali metal compound to produce a leach resistant final product. Preferably, the boric acid ($H_3BO_3$) is neutralized with calcium hydroxide ($Ca(OH)_2$) to produce a water insoluble calcium tetraborate that can be fused into a superior glass product that unequivocally meets the standards prescribed by 10 CFR 61.

Referring now to the drawing, which despicts the preferred process of this invention, the boric acid liquid wastes, commonly referred to as "evaporator bottoms", generated by a typical pressure water reactor (PWR) are evaporated and concentrated to about a 10 weight percent boric acid solution. The steam resulting from this evaporation process is directed to a vapor clean-up system for ultimate discharge or recycling. The boric acid solution is neutralized with a stoichiometric amount of calcium hydroxide or a similar calcium compound to yield a precipitate of insoluble calcium tetraborate according to the following equation:

$$4H_3BO_3 + Ca(OH)_2 \rightarrow CaB_4O_7(\downarrow) + 7H_2O$$

The insoluble calcium tetraborate can be filtered, centrifuged, decanted, or otherwise suitably separated and removed from solution. The resulting precipitate in the form of a slurry is then dried and fused directly into a mechanically strong, radionuclide-contained, leach resistant glass product, which can be packaged for permanent disposal.

As shown in the drawing, the supernate resulting from the precipitate separation is further evaporated and separated into a concentrate that can be dried and fused along with the precipitate with the remaining steam being directed to the vapor clean-up system.

While the above process is preferable, it should be appreciated that the sodium tetraborate realized from neutralizing boric acid with sodium hydroxide as earlier described also could be treated with a stoichiometric amount of calcium hydroxide or other calcium compounds to yield insoluble calcium tetraborate according to the following equation:

$$Na_2B_4O_7 + Ca(OH)_2 \rightarrow CaB_4O_7(\downarrow) + 2NaOH$$

The calcium tetraborate could then be separated from solution and fired into a glass product exhibiting leach resistant and radionuclide containment characteristics superior to those otherwise realized with the glass product resulting from fusing the sodium tetraborate, and certainly far superior to those achieved by solidification with cement or urea-formaldehyde.

The following example further illustrates the principles and preferred mode of this invention, but it is not to be construed as limiting the invention thereto.

EXAMPLE

A stock solution of simulated boric acid waste liquids was formed with the following weight percent constituents:

| | | | |
|---|---|---|---|
| Boric acid | 13.1% | Strontium | 0.55% |
| Sodium | 1.2 | Cesium | 0.79 |
| Phosphates | 0.09 | Cobalt | 0.24 |
| Calcium | 0.11 | Nitrates | 0.04 |
| Chlorides | 1.9 | Lithium | 0.03 |
| Potassium | 0.47 | Hydroxides | 0.07 |
| Carbonates | 0.36 | Silicates | 0.20 |

The remainder of the solution was water.

A 100 ml. aliquot of this stock solution was spiked with 1 ml. of mixed radionuclides comprised of Cobalt-60, Cesium-137, and Manganese-54. The resulting liquid was thoroughly mixed and, upon analyzing a sample thereof, was found to agree with typical radioactive waste samples taken from the evaporator bottoms of an active pressurized water reactor (PWR).

Two grams of calcium was dissolved in warm water to form a 100 ml. water mixture of calcium hydroxide ($Ca(OH)_2$) was added to the radioactive stock solution and thoroughly mixed therewith to neutralize the boric acid waste solution. After setting for a time, a portion of the liquid mixture slurry was distilled in clean glassware and a sample of the distillate was removed for analysis. The respective distillate activity for cobalt, manganese, and cesium was 0.4%, 0.3%, and 0.3%, respectively, thus trapping 99.6% of the radioactive cobalt, 99.7% of the radioactive manganese, and 99.7% of the radioactive cesium with the solid phase of the precipitate.

The balance of the mixture was evaporated to near dryness in a stainless steel beaker on a hot plate. A portion of the solids was removed from the beaker and placed into a graphite crucible. The crucible was placed into a resistance furnace and heated to a temperature ranging from about 986° C.–1100° C. and maintained at this temperature for at least an hour.

The furnace was subsequently turned off and allowed to cool slowly down to room temperature, whereupon the crucible was removed from the furnace. The crucible contained a light purple glass button. The purple coloration exhibits the presence of cobalt in the glass matrix and a survey of the button showed the bulk of the radioactivity still remaining in the glass.

From the foregoing, it is apparent that the objects of the present invention have been fully accomplished. As a result of this invention, an improved process is provided for disposing of radioactive boric acid wastes by immobilizing them into a solid, insoluble, radionuclide contained, inert form that can be safely buried in near-surface repositories. The boric acid wastes are neutralized with a stoichiometric amount of calcium hydroxide to yield calcium tetraborate which can be directly fused into a glass product of high mechanical integrity and which contains substantially all of the primary radwaste radionuclides. Moreover, the conversion of the original liquid radioactive waste into a glass or ceramic final product realizes a drastic volume reduction, on the order of less than 1/10 of the initial volume, thereby materially reducing costs in the handling, storage, transportation and final disposition of such low-level radioactive wastes. Thus, the present invention illustrates the mode of converting boric acid radioactive waste solutions into a reduced volume solid product containing the primary radwaste radionuclides and which can be buried in an environmentally safe and acceptable manner.

The foregoing description of a preferred embodiment of the invention has been presented for purposes of illustration and description and is not intended to be exhaustive nor to limit the invention to the precise form disclosed. It was chosen and described in order to best explain the principles of the invention and their practical application to thereby enable others skilled in the art to best utilize the invention in various embodiments and with various modifications as are suited to the particular use contemplated. It is intended that the scope of the invention be defined by the claims appended hereto.

I claim:

1. A method for immobilizing radioactive boric acid waste solutions comprising: neutralizing a boric acid waste solution containing radionuclides with calcium hydroxide and forming a precipitate, evaporating said precipitate to near dryness, and firing said dry precipitate to form a calcium borate glass product containing said radionuclides.

2. The method of claim 1, wherein said boric acid waste solution contains approximately 10% boric acid.

3. The method of claim 1, wherein said radionuclides include cobalt-60, cesium-137 and manganese-54.

4. The method of claim 1, wherein said precipitate is fired by heating to a temperature ranging from 986° to 1100° C.

* * * * *